United States Patent
Telpaz et al.

(10) Patent No.: US 12,360,533 B2
(45) Date of Patent: Jul. 15, 2025

(54) SYSTEM AND METHOD FOR MANAGING FLEET OF ELECTRIC VEHICLES

(71) Applicant: GM GLOBAL TECHNOLOGY OPERATIONS LLC, Detroit, MI (US)

(72) Inventors: Ariel Telpaz, Givat Haim Meuhad (IL); Refael Blanca, Hod Hasharon (IL); Nadav Baron, Herzliya (IL); Ravid Erez, Hod Hashron (IL); Daniel Urieli, Herzliya (IL); Ron Hecht, Raanana (IL); Barak Hershkovitz, Even Yehuda (IL)

(73) Assignee: GM Global Technology Operations LLC, Detroit, MI (US)

( * ) Notice: Subject to any disclaimer, the term of this patent is extended or adjusted under 35 U.S.C. 154(b) by 469 days.

(21) Appl. No.: 17/703,066

(22) Filed: Mar. 24, 2022

(65) Prior Publication Data
US 2023/0305568 A1  Sep. 28, 2023

(51) Int. Cl.
*G05D 1/00* (2024.01)
*B60L 58/12* (2019.01)

(52) U.S. Cl.
CPC ............ *G05D 1/0217* (2013.01); *B60L 58/12* (2019.02); *G05D 1/0225* (2013.01); *G05D 1/0291* (2013.01)

(58) Field of Classification Search
CPC ...... G06Q 10/02; G06Q 10/04; G06Q 10/063; G06Q 30/064; G06Q 50/06; G06Q 50/40; G08G 1/0112; G08G 1/0125; G08G 1/0137; G08G 1/202; G08G 1/205; H04L 67/12; Y02T 10/70; Y02T 90/12; B60L 2260/52; B60L 53/63; B60L 53/64; B60L 53/67;
(Continued)

(56) References Cited

U.S. PATENT DOCUMENTS

| | | | |
|---|---|---|---|
| 2021/0213849 A1* | 7/2021 | Sun .................. | B60L 53/68 |
| 2022/0074750 A1* | 3/2022 | Ludwick ............ | B60L 58/12 |

(Continued)

FOREIGN PATENT DOCUMENTS

| | | |
|---|---|---|
| DE | 102017119709 A1 | 3/2018 |
| DE | 102020131877 A1 | 7/2021 |

(Continued)

*Primary Examiner* — Andrew R Dyer
(74) *Attorney, Agent, or Firm* — Quinn IP Law (57) ABSTRACT

A system for managing a fleet of electric vehicles and respective fleet drivers includes a command unit having a processor and tangible, non-transitory memory on which instructions are recorded. The command unit is adapted to obtain input variables, including respective fleet tasks and their priority status. Route data for the respective fleet tasks is obtained. The command unit is adapted to obtain an objective function defined by a plurality of influence factors having respective weights. The command unit is adapted to obtain optimal charging schedules respectively for the electric vehicles and match the respective fleet tasks to the electric vehicles and the respective fleet drivers, based in part on the objective function, input variables and the route data. The influence factors may include energy cost optimization, timeliness of task completion and minimizing range anxiety. In some embodiments, the respective weights of the influence factors are designated by a fleet manager.

17 Claims, 4 Drawing Sheets

(58) Field of Classification Search
CPC ....... B60L 53/68; B60L 58/12; G05D 1/0217; G05D 1/0225; G05D 1/0291
See application file for complete search history.

(56) References Cited

U.S. PATENT DOCUMENTS

| | | | |
|---|---|---|---|
| 2022/0294244 A1* | 9/2022 | Helm | B60L 58/13 |
| 2023/0200296 A1* | 6/2023 | Zeiler | B60K 7/0007 56/10.1 |
| 2023/0234592 A1* | 7/2023 | Masquelier | G06Q 50/40 701/1 |
| 2024/0116388 A1* | 4/2024 | Kiessling | B60L 53/67 |

FOREIGN PATENT DOCUMENTS

| | | |
|---|---|---|
| DE | 102021109015 A1 | 10/2021 |
| DE | 102021125322 A1 | 4/2022 |
| DE | 102022102926 A1 | 8/2022 |

* cited by examiner

SYSTEM AND METHOD FOR MANAGING FLEET OF ELECTRIC VEHICLES

INTRODUCTION

The present disclosure relates generally to a system and method for managing electric-powered fleet vehicles. Fleet vehicles are groups of vehicles used and/or owned by an entity such as an organization, a business or a public agency. Fleet vehicles have become increasingly common. Examples of fleet vehicles include those operated by car rental companies, taxis or public buses, and police departments. Additionally, many online retailers may purchase or lease fleet vehicles to deliver products or packages to customers, or to enable sales representatives to travel to clients. Electric-powered fleet vehicles pose unique challenges compared to fleets employing internal combustion engines, such as issues related to battery charging and available range.

SUMMARY

Disclosed herein is a system for managing a fleet of electric vehicles and respective fleet drivers. The system includes a command unit having a processor and tangible, non-transitory memory on which instructions are recorded. The command unit is adapted to obtain input variables, including respective fleet tasks and their priority status. Route data for the respective fleet tasks is obtained. The command unit is adapted to obtain an objective function defined by a plurality of influence factors having respective weights. The command unit is adapted to obtain optimal charging schedules respectively for the electric vehicles and match the respective fleet tasks to the electric vehicles and the respective fleet drivers, based in part on the objective function, the input variables and the route data.

The input variables may include driving styles and alertness index of the respective fleet drivers. In some embodiments, the input variables include an available range, a cargo capability, a charging profile and propulsion energy consumption rate respectively associated with the electric vehicles. The input variables may include charging infrastructure data, including types of chargers available, charger locations, respective availability of charging sessions, and respective costs of the charging sessions.

In some embodiments, the input variables include data on the respective fleet tasks, including a trip starting point, a trip ending point, and respective time ranges between the trip starting point and the trip ending point. The input variables may include non-propulsion energy requirements of the respective fleet tasks, including energy to operate one or more electrical devices to perform the respective fleet tasks. The command unit may be adapted to match the respective fleet tasks to the electric vehicles based in part on availability of excess battery energy from the electric vehicles to meet the non-propulsion energy requirements. The plurality of influence factors may include energy cost optimization, timeliness of task completion and minimizing range anxiety. The respective weights of the plurality of influence factors are designated by a fleet manager.

The optimal charging schedules include an assigned charging location, charging cost, target battery charging level and charging time respectively assigned to the electric vehicles. The command unit may be adapted to determine an amount of excess battery energy available from at least one of the electric vehicles for transfer to a public grid and a timing of the transfer of the excess battery energy. The command unit may be adapted to dispatch remaining ones of the electric vehicles to a respective charging location, after each of the respective fleet tasks have been assigned.

The command unit may be adapted to determine a proposed new charging infrastructure by comparing respective outputs of a charging infrastructure simulation using historical data and different combinations of chargers. In some embodiments, the command unit is stored in a cloud computing service and the electric vehicles have a respective telematics control unit for establishing two-way communications with the command unit.

Disclosed herein is a method for managing a fleet of electric vehicles and respective fleet drivers. The method includes setting up a command unit with a processor and tangible, non-transitory memory on which instructions are recorded. Input variables are obtained, including respective fleet tasks and a priority status of the respective fleet tasks, via the command unit. The method includes obtaining route data for the respective fleet tasks and an objective function defined by a plurality of influence factors having respective weights, via the command unit. The method includes obtaining optimal charging schedules respectively for the electric vehicles and matching the respective fleet tasks to the electric vehicles and the respective fleet drivers, based in part on the objective function, the input variables and the route data, via the command unit.

The above features and advantages and other features and advantages of the present disclosure are readily apparent from the following detailed description of the best modes for carrying out the disclosure when taken in connection with the accompanying drawings.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Figure 1:
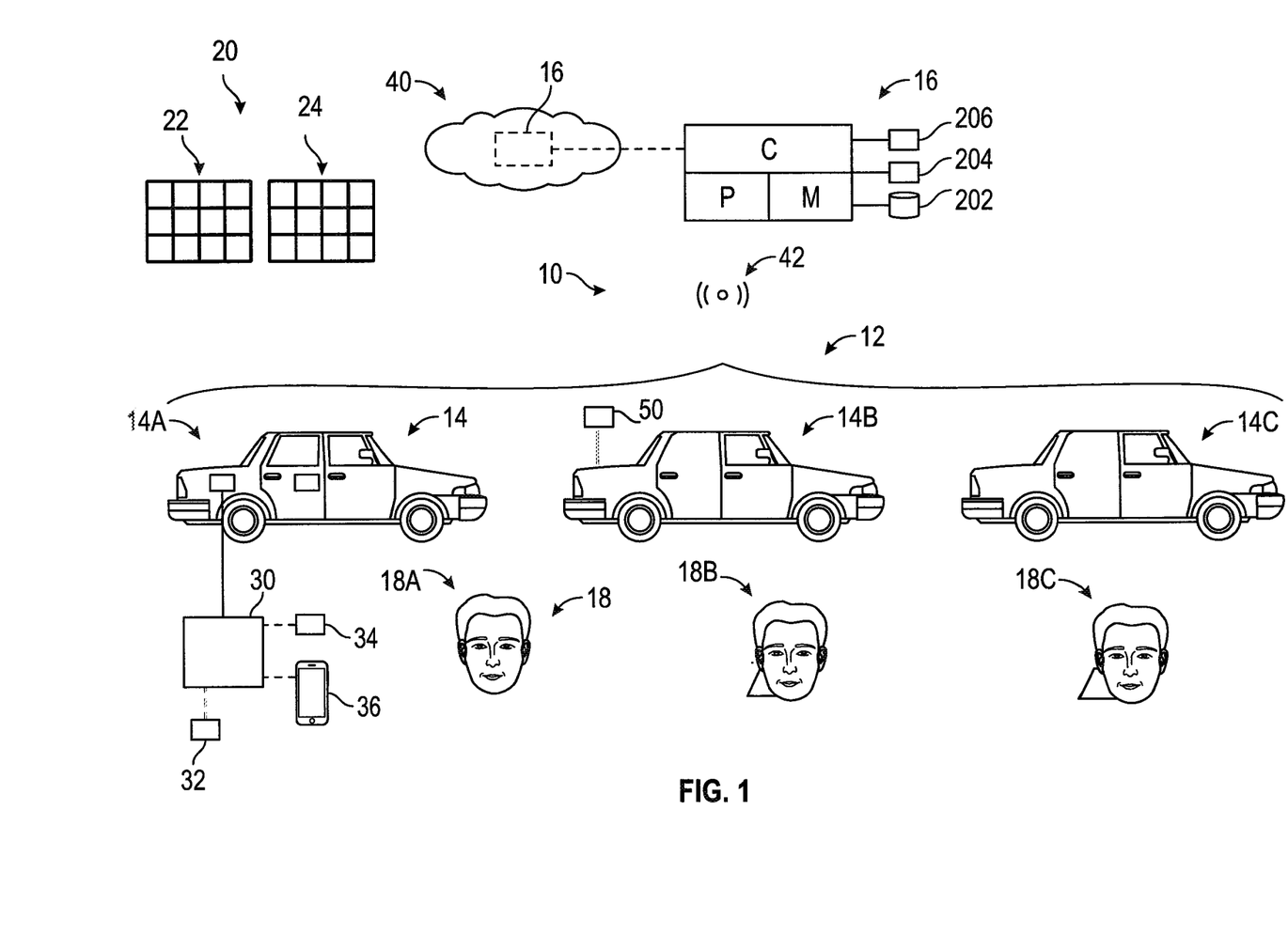
FIG. 1 is a schematic fragmentary diagram of a system for managing electric-powered fleet vehicles.

Referring to the drawings, wherein like reference numbers refer to like components, FIG. 1 schematically illustrates a system 10 for managing a fleet 12 of electric vehicles 14, e.g., first electric vehicle 14A, second electric vehicle 14B and third electric vehicle 14C. The electric vehicles 14 may be purely electric or partially electric/hybrid. The electric vehicles 14 may include, but are not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), train or another moving platform. It is to be understood that the electric vehicles 14 may take many different forms and have additional components.

Referring to FIG. 1, the system 10 includes a command unit 16 having an integrated controller C with at least one processor P and at least one memory M (or non-transitory, tangible computer readable storage medium) on which instructions are recorded for a method 100 (described below in FIG. 2) of managing the fleet 12. The memory M can store controller-executable instruction sets, and the processor P can execute the controller-executable instruction sets stored in the memory M. The system 10 employs a data-driven recommendation of optimized charging infrastructure.

It is a challenging task for fleet managers to assign fleet tasks to the appropriate electric vehicles 14 and drivers 18 (e.g., drivers 18A, 18B, 18C shown in FIG. 1) optimizing their available range and energy consumption, in addition to scheduling charging times and locations for the fleet 12. The system 10 takes as input information regarding the characteristics of the electric vehicles 14, the capabilities of the drivers 18 related to energy consumption, tasks demands and priority, as well as charging infrastructure 20, which includes the fleet chargers 22 and public chargers 24. This system 10 is adapted to consider constraints to ensure that the tasks of the fleet 12 may be completed on time, with the focus being the highest priority tasks.

Referring to FIG. 1, the electric vehicles 14 each include respective vehicle controllers 30 collecting information from a network of sensors 32 inside the electric vehicles 14. Referring to FIG. 1, the electric vehicles 14 may include a respective telematics control unit 34 for establishing two-way communications with the command unit 16, including recording and transmitting vehicle data. For example, the respective telematics control unit 34 may collect telemetry data from the electric vehicles 14, such as location, speed, engine data, maintenance requirements and servicing, by interfacing with various internal sub-systems. The respective telematics control unit 34 may enable vehicle-to-vehicle (V2V) communication and/or a vehicle-to-everything (V2X) communication.

Referring to FIG. 1, the electric vehicles 14 may include a respective mobile application 36 for communicating with the command unit 16. The mobile application 36 may be embedded in a smart device (e.g., smart phone) belonging to a user of the electric vehicles 14, which may be plugged in or otherwise linked to the electric vehicles 14. The respective mobile application 36 may be physically connected (e.g., wired) to the electric vehicles 14 as part of the vehicle infotainment unit. The circuitry and components of a mobile application ("apps") available to those skilled in the art may be employed.

Referring to FIG. 1, the command unit 16 may be stored in an "off-board" or remotely located cloud computing service 40. The cloud computing service 40 may include one or more remote servers hosted on the Internet to store, manage, and process data. The cloud computing service 40 may be at least partially managed by personnel at various locations. The cloud computing service 40 may be a private or public source of information maintained by an organization, such as for example, a research institute, a company, a university and/or a hospital.

The system 10 may employ a wireless network 42 for communications between the electric vehicles 14 and the command unit 16, shown in FIG. 1. The wireless network 42 may be a short-range network or a long-range network. The wireless network 42 may be a communication BUS, which may be in the form of a serial Controller Area Network (CAN-BUS). The wireless network 42 may be a serial communication bus in the form of a local area network. The local area network may include, but is not limited to, a Controller Area Network (CAN), a Controller Area Network with Flexible Data Rate (CAN-FD), Ethernet, blue tooth, WIFI and other forms of data. The wireless network 42 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 2:
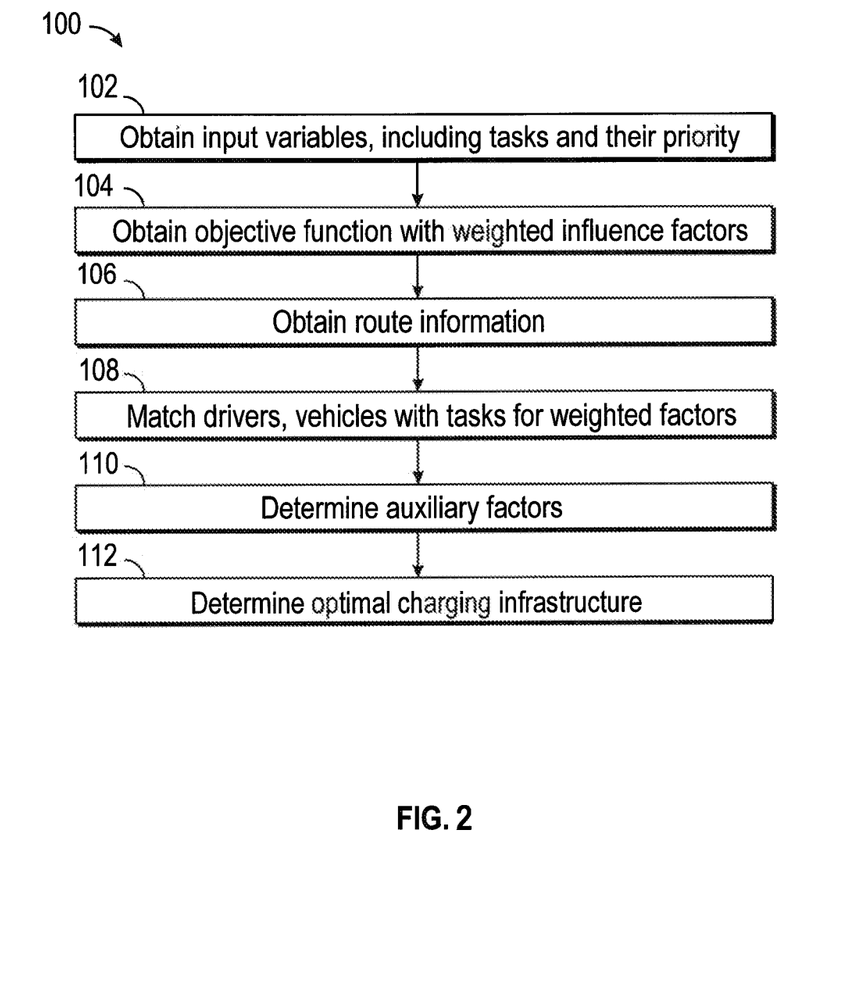
FIG. 2 is a flowchart for a method of operating the system of FIG. 1.

Referring now to FIG. 2, a flowchart of a method 100 of operating the system 10 (of managing the fleet 12 of electric vehicles 14) is shown. In some embodiments, method 100 may be embodied as computer-readable code or stored instructions and may be at least partially executable by the command unit 16. Method 100 need not be applied in the specific order recited herein. Furthermore, it is to be understood that some blocks may be eliminated.

Per block 102 of FIG. 2, the method 100 includes obtaining input variables, including a list of assignments or fleet tasks and their respective order of priority. The fleet tasks may include the starting point and ending point of a trip, the type of cargo or load required by the fleet task, the respective time ranges to the trip starting point and the trip ending point and other factors. The input variables may be stored in a database or data module 202 (see FIG. 1). The input variables further include driver data and vehicle data. The driver data may include driving style, energy efficient driving per trip type (urban, highway), handling of trailers, alertness index and other factors. In one example, the alertness index is be defined to be inversely related to the number of hours driven by the respective driver 18 in a previous time range, e.g., the last 24 hours.

The vehicle data may include data specific to each of the electric vehicles 14, such as the propulsion energy consumption rate, available range, energy consumption per trip type and charging profile. The vehicle data may include battery thermal preconditioning requirements, load/cargo capabilities, performance with trailers for each of the electric vehicles 14 and other factors. The input variables further include charging infrastructure data such as the type of chargers (AC or DC), the geographical location of the chargers in the charging infrastructure 20 and the respective times of the available charging sessions.

The input variables may include non-propulsion energy requirements of the fleet tasks. In other words, the command unit 16 may be adapted to consider instances in which the task duty requires using energy from the electric vehicles 14 to operate one or more electrical devices 50 (see FIG. 1) for completing a task. This is referred to herein as vehicle-to-load energy transfers. For example, the electrical device 50 may be an electrical chainsaw that is plugged into the battery of an electric vehicle 14 for completing a task or assignment. The command unit 16 (via the Assignment Matching Module 208 described below) may be adapted to consider availability of excess battery energy from the electric vehicles 14 to meet the non-propulsion energy requirements of the fleet tasks when selecting the appropriate electric vehicle 14 and driver 18 for a task.

Figure 3:
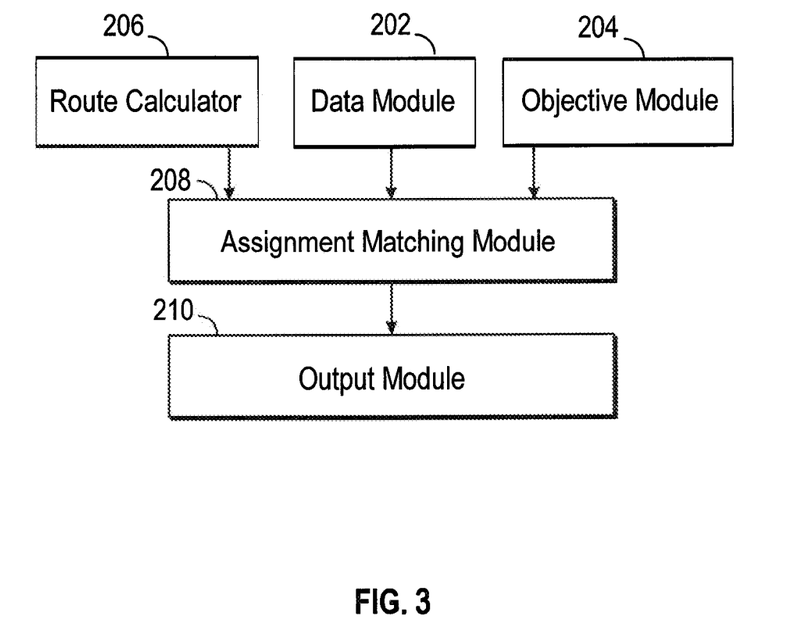
FIG. 3 is a schematic diagram of an example modular architecture employable by the system of FIG. 1.

Proceeding to block 104 of FIG. 2, the method 100 includes obtaining an objective function. The objective function defines the goals of the optimization and includes maximizing or minimizing a real function. The objective function is defined by a plurality of influence factors, such as energy cost optimization, timeliness of task completion on time (with priority considered), minimizing range anxiety (e.g., maintaining a minimum battery level of above 10%). Each of the influence factors is assigned a respective weight or percentage. In some embodiments, the fleet managers define the influence factors and assign their respective weights. Referring to FIG. 3, the objective function may be stored in an Objective Module 204 and inputted into the Assignment Matching Module 208, to be described below. For example, if the fleet manager believes that optimizing the cost of energy is a relatively higher priority than completing the tasks on time, then the system 10 may be adapted to delay duties in order to charge the electric vehicle 14 in off-peak electricity hours, which is cheaper.

Per block 106 of FIG. 2, the method 100 includes obtaining route data for each of the assignments or fleet tasks. The route data may be obtained via a Route Calculator 206 (see FIG. 1) that calculates routes between the starting point and ending point of respective trips in the assignments.

Advancing to block 108 of FIG. 2, the method 100 includes matching the drivers 18 and electric vehicles 14 with the fleet tasks and determining optimal charging schedules. An example modular architecture for the system 10 is shown in FIG. 3. Referring to FIG. 3, the respective data from the Data Module 202, Objective Module 204 and Route Calculator 206 are inputted into an Assignment Matching Module 208.

Referring to FIG. 3, the Assignment Matching Module 208 considers the tasks demands, drivers' capabilities related to energy consumption, and vehicles characteristics. The drivers 18 and electric vehicles 14 are matched with fleet tasks/assignments based on the weighted plurality of influence factors. The output module 210 (see FIG. 3) receives the results of the optimal matching between the electric vehicles 14, drivers 18 and tasks as well as the charging schedule based on the matching results.

Finding the optimal assignment policy may be done in a number of ways available to those skilled in the art. For example, Bellman equations may be used to maximize the total reward across each of the fleet tasks/assignments. In another example, a fast forward planning system with a heuristic estimate may be employed. The goal is to find a sequence of actions that will maximize the rewards (discounted or undiscounted, depending on the value of gamma). The Assignment Matching Module 208 may be updated at regular intervals or triggered by specific events. The triggers may include a change in status of in at least one of the electric vehicles 14 (e.g., change in availability and battery status), a change in status of at least one driver 18 (e.g., on duty, assigned/not assigned) and a change in status of a task (e.g., modified task location or changed deadline).

Figure 4:
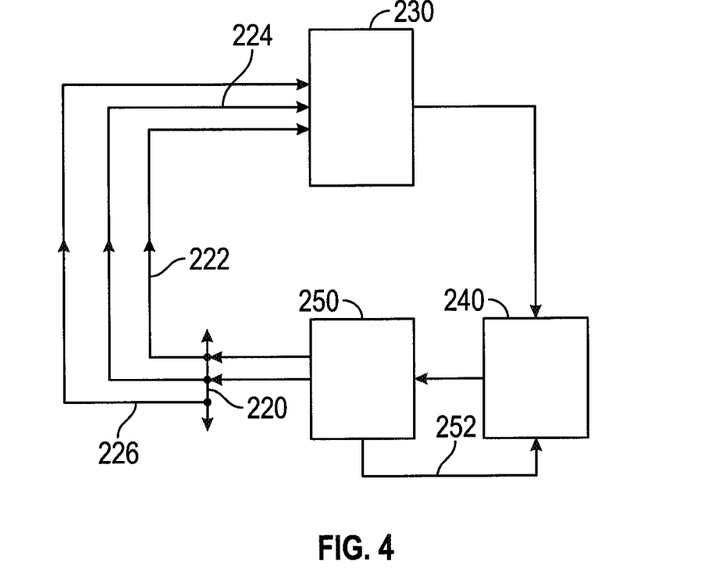
FIG. 4 is a schematic diagram of an example assignment selection process employable by the system of FIG. 1.

An example assignment selection process employable by the system 10 is shown in FIG. 4. It is understood that other types of methods available to those skilled in the art may be employed. FIG. 4 shows an Assignment Scoring Module 230, a Charging Assigner Module 240 and a Fleet Task Module 250. For each task, the Assignment Scoring Module 230 determines the optimal selection of driver 18 and electric vehicle 14. The Charging Assigner Module 240 determines the charging schedules (e.g., time and location) of the electric vehicles 14 in the charging infrastructure 20. The Fleet Task Module 250 stores the details of which driver 18 and electric vehicle 14 have been matched to the tasks and their respective charging schedules.

The process is iterative and addresses each task in order of priority, with the highest priority task assigned first. As shown at starting point 220, the Assignment Scoring Module 230 receives a state input 222 (representing what the current state S is), a reward input 224 (representing an expected benefit or reward) and a task input 226 (representing what the current task T is). Here, S represents the state of the fleet 12 which changes following each assignment of a driver 18 and an electric vehicle 14 to a task.

Figure 5:
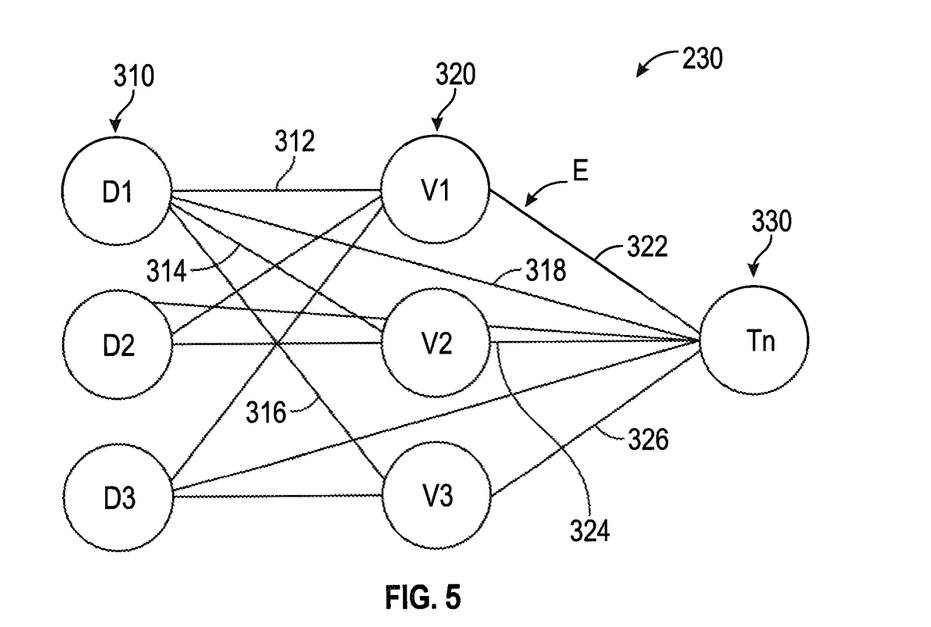
FIG. 5 is a schematic diagram of an example assignment scoring process employable by the system of FIG. 1.

The process begins with the first fleet task ($T_1$) designated as having the highest priority. At State S1, the Assignment Scoring Module 230 assigns a driver ($D_{t1}$) and a vehicle ($V_{t1}$) to the fleet task ($T_1$). An example implementation of the Assignment Scoring Module 230 is shown in FIG. 5. This information is sent to the Charging Assigner Module 240 which determines the charging schedule for the assigned vehicle ($V_{t1}$). The Fleet Task Module 250 is then updated.

The state changes as the driver ($D_{t1}$) and the vehicle ($V_{t1}$) are already assigned and their attributes may have changed. For example, the attributes may include projected location, projected availability (completion) time, changes in future trip times and routes (due to changed traffic), driver fatigue and available range.

In the second cycle, the second fleet task ($T_2$) having the second-highest priority is inputted by the task input 226 into the Assignment Scoring Module 230, which also receives updated values of the state input 222 and reward input 224. For State S2, the Assignment Scoring Module 230 assigns a driver ($D_{t2}$) and vehicle ($V_{t2}$) for the second fleet task ($T_2$). Note that these may be the same driver or vehicle assigned in the first fleet task, especially if the second fleet task will be on the route or near the location of the first fleet task. This information is sent to the Charging Assigner Module 240 which determines the charging schedule for the assigned vehicle ($V_{t2}$). The Fleet Task Module 250 is updated. The transition is made from state to state until each of the fleet tasks ($T_{t1}$) have been assigned to a driver 18 and an electric vehicle 14. Once each of the tasks have been assigned, the remaining unassigned vehicles (as indicated by line 252) are sent to the Charging Assigner Module 240.

Referring now to FIG. 5, an example implementation of the Assignment Scoring Module 230 is shown. As noted previously, the Assignment Scoring Module 230 selects or optimally matches a driver 18 and an electric vehicle 14 to a specific task (Tn). FIG. 5 shows a first set 310 of driver nodes (e.g., D1, D2 and D3), a second set 320 of vehicle nodes (e.g., V1, V2 and V3) and a task node 330 (for task Tn). Each node in the first set 310 connects with other nodes in second set 320 and the task node via respective edges E. For example, driver node D1 connects with vehicle node V1, V2 and V3 via first DV edge 312, second DV edge 314 and third DV edge 316, respectively. Driver node D1 connects with task node 330 via first DT edge 318. The vehicle nodes V1, V2 and V3 connect with task node 330 via first VT edge 322, second VT edge 324 and third VT edge 326, respectively.

Each respective node in FIG. 5 is assigned a score that is based on maximizing the objective function. The driver score may be a weighted combination of average driving velocity, fatigue, energy efficient driving and other related features. The vehicle score may be focused on energy efficiency and available range.

Each of the respective edges E is assigned a score that reflects the interactions or the fit between the nodes. The score may reflect driver expertise, the distance of a driver 18 to an electric vehicle 14 and to the task location and the type of vehicle or machinery required for the task under consideration. For example, the third DV edge 316 between driver node D1 and vehicle node V3 (which is a minivan in this example) may score a high weight if the driver D1 has the best energy consumption performance when driving a minivan which is V3. The third VT edge 326 between the task node 330 and the vehicle node V3 may score a high weight if the task Tn requires a minivan. The weights may be calibrated or pre-defined and learned over time using gradient descent techniques and other methods available to those skilled in the art. Following execution of each assignment, the performance of the Assignment Matching Module 208 may be employed to update the weights.

Referring to FIG. 4, the Charging Assigner Module 240 is tasked with assigning the electric vehicles 14 to a charging session as needed. If an electric vehicle 14 is not chosen for a task, it may automatically be sent to a charging session. The factors considered by the Charging Assigner Module 240 include whether the battery state is below a certain threshold and the proximity of the electric vehicle 14 to a charger in the charging infrastructure 20. Other factors under consideration are when an electric vehicle 14 is chosen for a task but needs additional energy to complete it and whether the vehicle trip completion time is close to a time when a charger is available.

If there is a conflict due to more electric vehicles 14 requiring charging than available spots in the charging infrastructure 20, the charging may be prioritized based on criteria such as rank in energy consumption or specific tasks that cannot be accomplished with other vehicles. Electric vehicles 14 with higher priority tasks may be sent to the faster chargers first. Due to cost, there may be a higher preference for charging at the fleet chargers 22 than the public chargers 24.

Proceeding to block 110 of FIG. 2, the method 100 may include determining auxiliary factors such as availability of vehicle-to-grid energy transfers. The command unit 16 may be adapted to consider the sale and transfer of available energy from the electric vehicles 14 to a public or private grid, referred to herein as vehicle-to-grid energy transfers. This results in a reduction of costs for the fleet 12. The command unit 16 may receive real time updates from the grid on the energy cost and may adjust the charging times accordingly in order to minimize energy costs.

The auxiliary factors may include determining availability of charging slots in the fleet chargers 22 for public use. The results from the Assignment Matching module 208 (see FIG. 3) may be used to sell usage of the fleet chargers 22 to the public during no-use time slots. As noted above, the output module 210 receives a schedule of available charging slots in the fleet chargers 22. The slots may be offered to the public for a given cost, who would be informed about charging time limits and potential fines for exceeding the charging time limits.

Per block 112 of FIG. 2, the command unit 16 may be adapted to determine a proposed new charging infrastructure by comparing respective outputs of a charging infrastructure simulation using historical data and different combinations of chargers. First, the Assignment Matching Module 208 is run multiple times over a time period (e.g., at time t1, t2, t3, tn) with various input variables from historical data. With those results, a charging infrastructure simulation is performed with different combinations of chargers. The outputs of the charging infrastructure simulations are compared with previous matching data reflecting energy cost, range anxiety events, on-time task, completion rate over the same time period (e.g., at time t1, t2, t3, tn). Based on a comparison of the benefits of different combinations of chargers, optimal parameters for the charging infrastructure 20 may be determined.

In summary, a comprehensive system 10 of managing a fleet 12 is presented. The system 10 overcomes challenges in managing a fleet 12 of electric vehicles due to issues such as variable charging durations and available range. The energy costs for a fleet 12 is optimized, making it more beneficial for a fleet 12 to purchase electric vehicles 14.

The command unit 16 of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer can read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for controlling operation of an electric vehicle having a battery unit and a vehicle controller, the method comprising:
   connecting an electrical device into the battery unit, the electric vehicle being part of a fleet having a plurality of electric vehicles, the electrical device being adapted to perform at least one fleet task through a vehicle-to-load energy transfer;
   communicating with a command unit via the vehicle controller, the command unit having a processor and tangible, non-transitory memory on which instructions are recorded;
   obtaining input variables, including respective fleet tasks for the plurality of electric vehicles and a priority status of the respective fleet tasks, via the command unit;
   obtaining route data for the respective fleet tasks and an objective function defined by a plurality of influence factors having respective weights, via the command unit;
   obtaining optimal charging schedules respectively for the plurality of electric vehicles and assign the respective fleet tasks based in part on the objective function, the input variables and the route data, via the command unit, the fleet having access to fleet chargers, wherein the assigned fleet tasks exclude the charging, there being at least one remaining unassigned vehicle;
   generating a schedule of no-use time slots of available charging slots in the fleet chargers, via the command unit;
   selling usage of the fleet chargers directly to public during the no-use time slots, including informing the public regarding charging time limits, via the command unit;
   dispatching remaining unassigned electric vehicles from the plurality of electric vehicles to a respective charging location, after each of the respective fleet tasks have been assigned; and
   directing control of the vehicle-to-load energy transfer to the electrical device based in part on the optimal charging schedule and availability of excess battery energy, via the command unit.

2. The method of claim 1, further comprising:
   selecting the input variables to include driving styles and alertness index of respective fleet drivers in the plurality of electric vehicles, an available range, a cargo capability, a charging profile and a propulsion energy consumption rate respectively associated with the plurality of electric vehicles.

3. The method of claim 1, further comprising:
   selecting the input variables to include charging infrastructure data, including types of chargers available, charger locations, respective availability of charging sessions, and respective costs of the charging sessions.

4. The method of claim 1, further comprising:
   selecting the plurality of influence factors to include energy cost optimization, timeliness of task completion and minimizing range anxiety, the respective weights of the plurality of influence factors being designated by a fleet manager.

5. The method of claim 1, further comprising:
   informing the public regarding respective fines for exceeding the charging time limits, via the command unit, and selecting the electrical device to be an electrical chainsaw.

6. A system for controlling operation of an electric vehicle having a vehicle controller, the system comprising:
   a command unit in communication with the vehicle controller and having a processor and tangible, non-transitory memory on which instructions are recorded;
   a battery unit installed within the electric vehicle, the electric vehicle being part of a fleet having a plurality of electric vehicles;
   an electrical device plugged into the battery unit, the electrical device being adapted to perform at least one fleet task through a vehicle-to-load energy transfer from the electric vehicle;
   wherein the command unit is adapted to:
   obtain input variables, including respective fleet tasks for the plurality of electric vehicles and a priority status of the respective fleet tasks;
   obtain route data for the respective fleet tasks and an objective function defined by a plurality of influence factors having respective weights;
   obtain optimal charging schedules respectively for the plurality of electric vehicles and assign the respective fleet tasks based in part on the objective function, the input variables and the route data, the fleet having access to fleet chargers, wherein the assigned fleet tasks exclude the charging;
   generate a schedule of no-use time slots of available charging slots in the fleet chargers;
   wherein the command unit is adapted to sell usage of the fleet chargers directly to public during the no-use time slots, including informing the public regarding charging time limits;
   wherein the command unit is adapted to dispatch remaining unassigned electric vehicles from the plurality of electric vehicles to a respective charging location, after each of the respective fleet tasks have been assigned; and wherein the command unit directs control of the vehicle-to-load energy transfer to the electrical device based in part on the optimal charging schedule and availability of excess battery energy.

7. The system of claim 6, wherein the input variables include driving styles and alertness index of respective fleet drivers for the plurality of electric vehicles.

8. The system of claim 6, wherein the input variables include an available range, a cargo capability, a charging profile and propulsion energy consumption rate respectively associated with the plurality of electric vehicles.

9. The system of claim 6, wherein the input variables include charging infrastructure data, including types of chargers available, charger locations, respective availability of charging sessions, and respective costs of the charging sessions.

10. The system of claim 6, wherein the input variables include data on the respective fleet tasks, including a trip starting point, a trip ending point, and respective time ranges between the trip starting point and the trip ending point.

11. The system of claim 6, wherein the plurality of influence factors includes energy cost optimization, timeliness of task completion and minimizing range anxiety.

12. The system of claim 11, wherein the respective weights of the plurality of influence factors are designated by a fleet manager.

13. The system of claim 6, wherein the optimal charging schedules include an assigned charging location, charging cost, target battery charging level and charging time respectively assigned to the plurality of electric vehicles.

14. The system of claim 6, wherein the command unit is adapted to determine proposed parameters for a new charging infrastructure by comparing respective outputs of a charging infrastructure simulation using historical data and different combinations of chargers.

15. The system of claim 6, wherein the command unit is stored in a cloud computing service and the plurality of electric vehicles have a respective telematics control unit for establishing two-way communications with the command unit.

16. The system of claim 6, wherein the electrical device is an electrical chainsaw.

17. The system of claim 6, wherein the command unit is adapted to inform the public regarding respective fines for exceeding the charging time limits.

* * * * *